United States Patent [19]

Zajac et al.

[11] Patent Number: 4,767,180
[45] Date of Patent: Aug. 30, 1988

[54] DEVICE FOR MAKING A NON-PERMANENT CONNECTION BETWEEN TWO OPTICAL FIBERS, MOBILE PLUG MEMBERS AND HOLDING DEVICE FOR SAME, AND APPROPRIATE METHOD OF PREPARING AN OPTICAL FIBER TERMINATION

[75] Inventors: Elie Zajac, Gagny; Roland Desmurs, Saint-Cloud; Jean L. Pelletier, Paris, all of France

[73] Assignees: Radiall Industrie; Socapex; Souriau & Cie, all of France

[21] Appl. No.: 894,803

[22] Filed: Aug. 8, 1986

[30] Foreign Application Priority Data

Aug. 13, 1985 [FR] France .................. 85 12336

[51] Int. Cl.4 .............................................. G02B 6/36
[52] U.S. Cl. .................. 350/96.21; 350/96.20
[58] Field of Search ........................... 350/96.20, 96.21

[56] References Cited

U.S. PATENT DOCUMENTS 3,885,859 5/1975 Dalgleish et al. ................... 350/96
4,135,783 1/1979 Kunze ................ 350/96.21
4,148,559 4/1979 Gauthier ............ 350/96.21
4,247,164 1/1981 Mannschke ....... 350/96.21

FOREIGN PATENT DOCUMENTS 0085825 1/1983 European Pat. Off. .
090724 3/1983 European Pat. Off. .
0103527 9/1983 European Pat. Off. .
2367295 10/1976 France .
2476856 2/1980 France .
58-1113 11/1984 Japan .

Primary Examiner—William L. Sikes
Assistant Examiner—Akm E. Ullah
Attorney, Agent, or Firm—Nixon & Vanderhye

[57] ABSTRACT

A device makes a non-permanent connection between two optical fibers each fixed into a respective fiber holding device from which a bared end of the fiber protrudes. The device comprises a socket member featuring a guide member to accommodate the aligned bared fiber ends. A clamp member in line with the guide member immobilizes the bared fiber ends by clamping them against the guide member. Two mobile plug members are each adapted to interlock nesting fashion with the socket member, one on each side of the guide member. Their axes are at a predetermined angle to the guide member. Each plug member comprises a front surface through which it comes into an abutting and supporting relationship with the other plug member. At a rear end of a central channel in the plug member is a receptacle for the fiber holding device. There is an orifice at the front end of this channel slightly larger than the diameter of the bared fiber end. The length of the central channel is sufficient to allow part of the bared fiber end to protrude after the fiber holding device is fitted into the receptacle. The width of the central channel is sufficient to allow limited flexing of the bared fiber end in response to loads applied to its protruding part. Plugging the plug members into the socket member brings the end surfaces of the two fibers into contact inside the guide member. Flexing of the fiber in the central channel produces reaction forces to pressurize the contact. It also allows displacement of the mating plane defined by the contacting end surfaces relative to the median plane of the device.

15 Claims, 3 Drawing Sheets

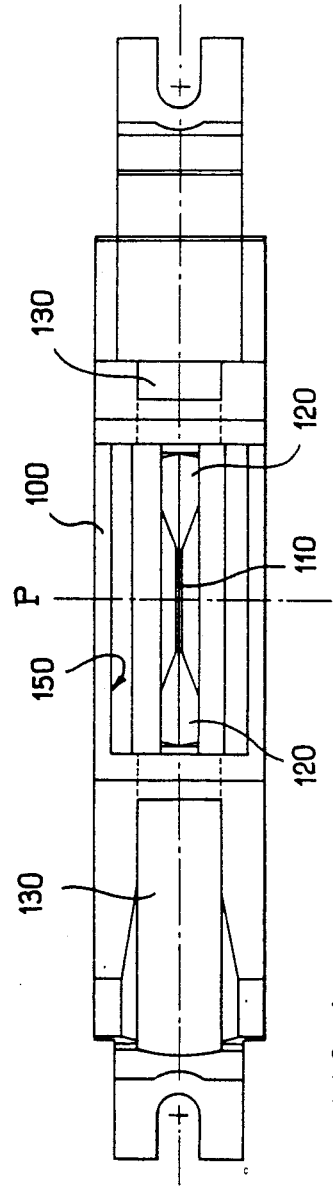
FIG_1
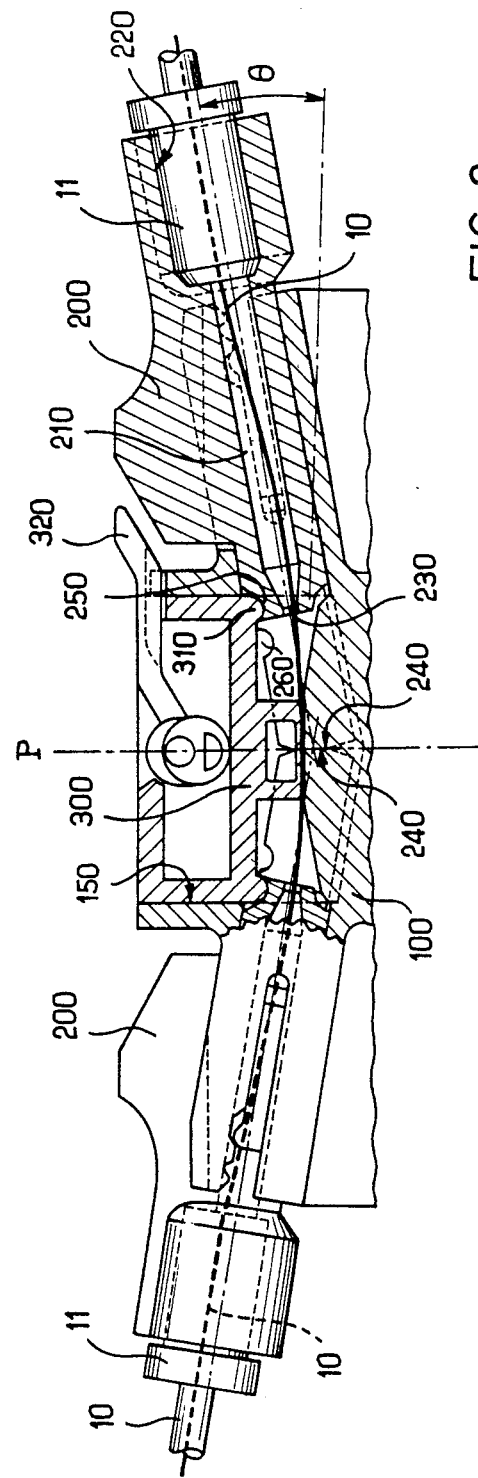
FIG_2

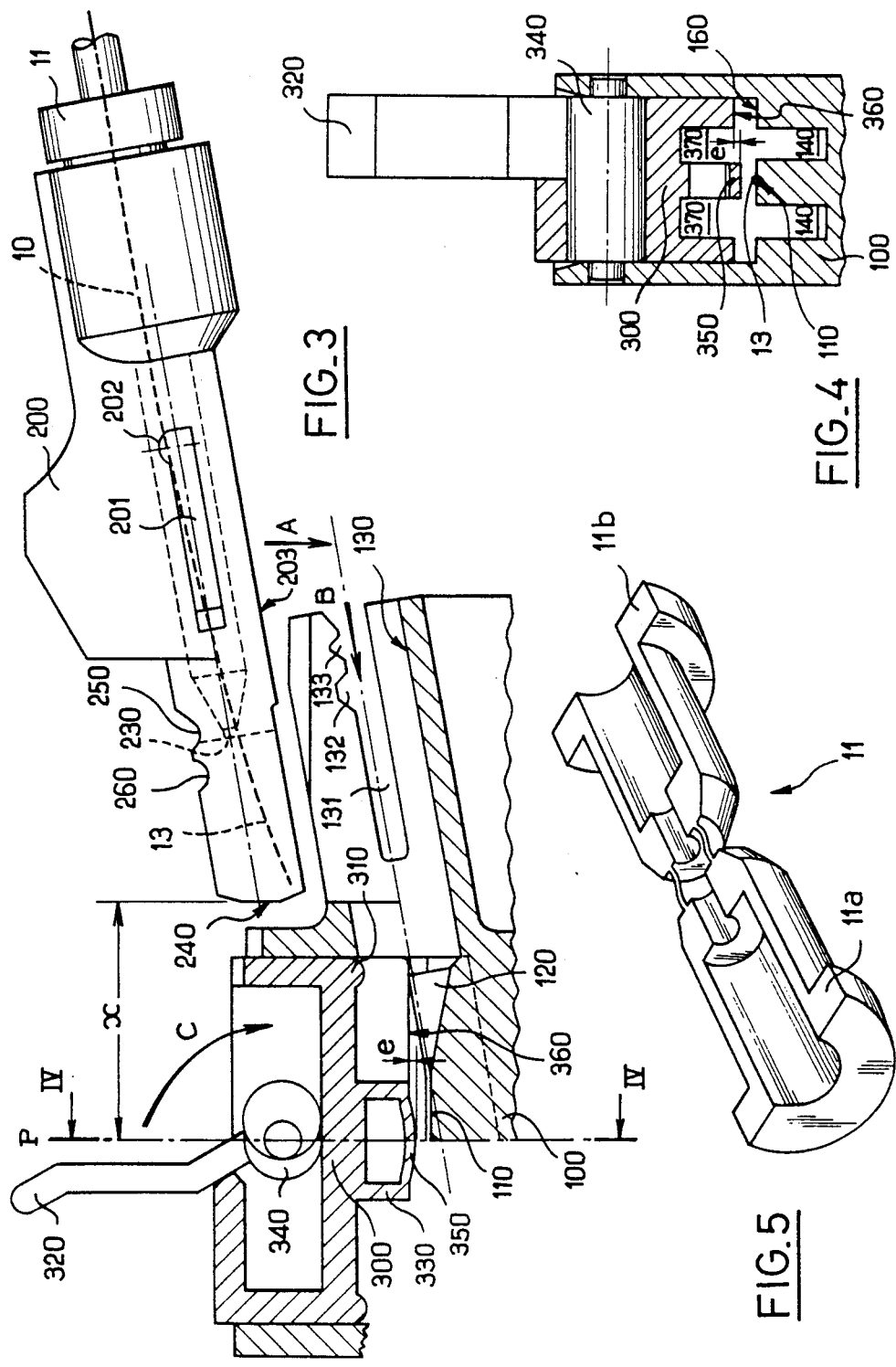

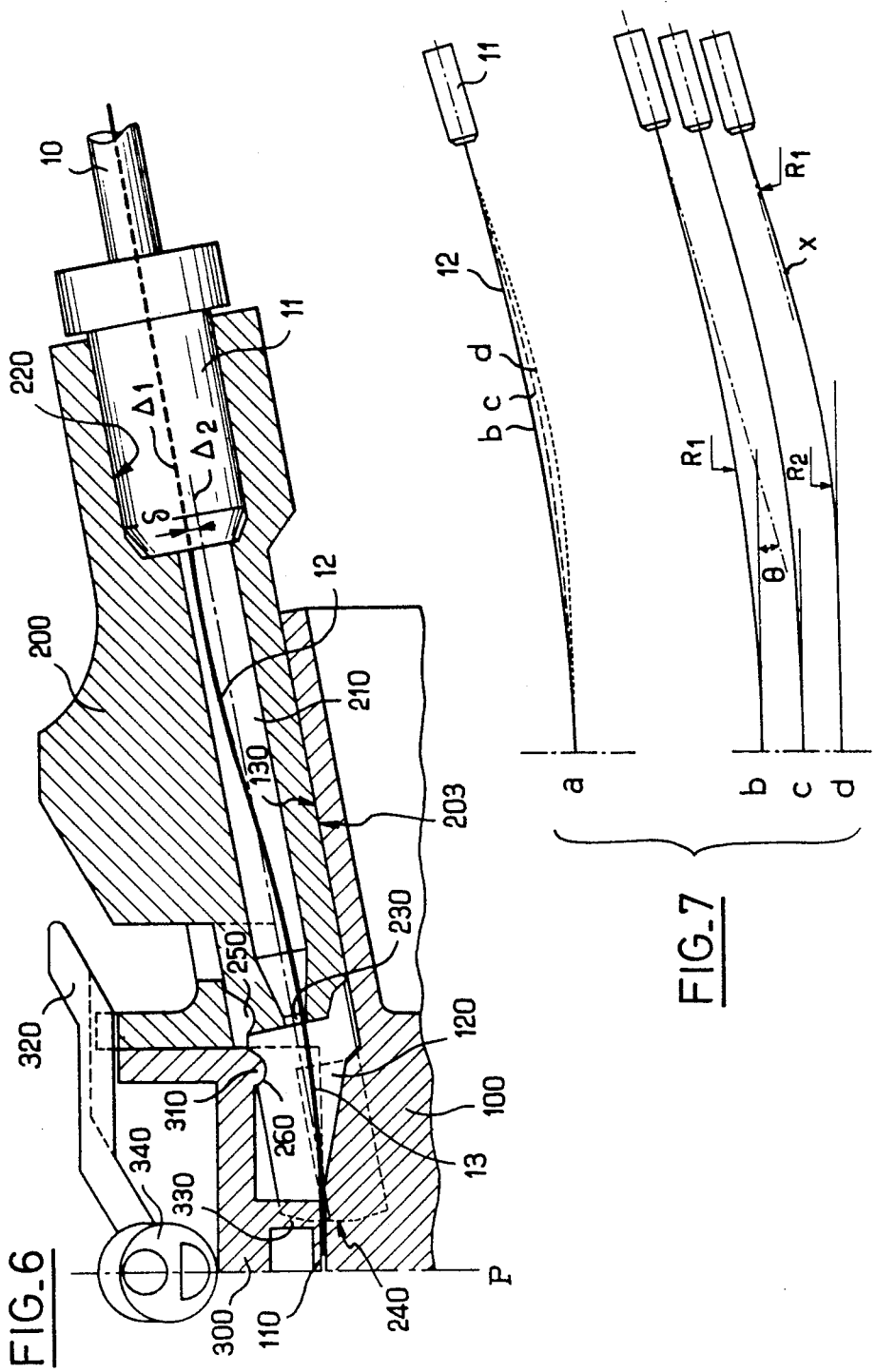

DEVICE FOR MAKING A NON-PERMANENT CONNECTION BETWEEN TWO OPTICAL FIBERS, MOBILE PLUG MEMBERS AND HOLDING DEVICE FOR SAME, AND APPROPRIATE METHOD OF PREPARING AN OPTICAL FIBER TERMINATION

BACKGROUND OF THE INVENTION

1. Field of the invention

The present invention concerns a device for making a non-permanent connection between two optical fibers.

To be more precise, it concerns connecting devices in which each of the optical fibers is fixed into a respective holding device allowing a bared fiber end to protrude.

2. Description of the prior art

Such devices comprise:

a socket member provided with a guide member receiving the aligned two bared fiber ends, and a clamp member in line with the guide member to immobilize the bared fiber ends by clamping them against the latter.

French Pat. Nos. 2 367 295 and 2 476 856 describe examples of devices of this type.

However, in the prior art devices the free part of the fiber (meaning the part protruding from the fiber holding device) is neither held nor oriented towards the guide member at the time the fiber is fitted into the connecting device.

Fitting the fiber therefore necessitates considerable care, limiting the use of such connecting devices to permanent or semi-permanent connections.

The invention is intended to resolve these limitations on use by virtue of a specific design of the device whereby connections and disconnections can be made repetitively without any special precautions, in the same way as with an electrical plug or plug-in connector, while simultaneously conforming to the extremely strict requirements specific to optical fibers with regard to alignment and abutting of the bared fiber ends.

SUMMARY OF THE INVENTION

The present invention consists in a device for making a non-permanent connection between two optical fibers each of which is fixed into a respective fiber holding device from which protrudes a bared end of the fiber, the device comprising a socket member, a guide member on said socket member adapted to accommodate the aligned bared fiber ends, a clamp member in line with said guide member adapted to immobilize said bared fiber ends by clamping them against said guide member, and two mobile plug members each adapted to interlock nesting fashion with said socket member one on each side of said guide member so that their axes are at a predetermined angle to said guide member, wherein each plug member comprises a front surface through which it is adapted to come into an abutting and supporting relationship to the other plug member, a central channel, a receptacle at a rear end of said channel for said fiber holding device, and an orifice at a front end of said channel slightly larger than the diameter of said bared fiber end, and the length of said central channel is sufficient to allow part of said bared fiber end to protrude beyond it after said fiber holding device is fitted into said receptacle and the width of said central channel is sufficient to allow limited flexing of said bared fiber end in response to loads applied to said protruding part thereof, whereby plugging said plug members into said socket member brings the end surfaces of the two fibers into contact inside said guide member, flexing of the fiber in said central channel producing reaction forces to pressurize this contact and allowing displacement of the mating plane defined by the contacting end surfaces relative to the median plane of the device.

An axis of the receptacle is preferably offset relative to an axis of the central channel so as to position the protruding part of the bared fiber end in a plane containing the two axes after insertion of the fiber holding device into the plug member.

The guide member preferably has at each end a flared surface constituting a preliminary guide member.

The device preferably further comprises locking means operative in a connected position to prevent removal of the plug members from the socket member or their insertion into the socket member.

In this case, advantageously:

control means are adapted to actuate the locking means and the clamp member, the locking means also define a temporary disconnection position to prevent withdrawal of the plug members from the socket member following limited movement of the plug members to the rear of their connected position.

The socket member preferably comprises two symmetrical slides adapted to receive the plug members and guide them towards the guide member.

In this case, advantageously:

the slides are inclined towards the guide member, relative to the general plane of the socket member, and a rear part of the slides is open upwardly to allow the plug member to be inserted into the slide through the top part thereof.

The clamp member preferably comprises:

a member movable in translation and a cam for moving this member, a deformable elastic member in line with the guide member, and abutment surfaces adapted to contact the socket member to limit the travel of the clamp member and the deformation of the elastic member in order to immobilize the fibers without unduly stressing them.

In other aspects the invention consists in a plug member and a fiber holding device specially designed for the connecting device as just defined.

In a final aspect, the invention consists in a method of preparing an optical fiber termination comprising the steps of:

placing a fiber in a fiber holding device allowing a bared fiber end to protrude therefrom, insetting the fiber holding device and fiber into an appropriate plug member, breaking off the bared fiber end at a predetermined distance from the end of the plug member.

Other characteristics and advantages of the invention will emerge from the following detailed description of one embodiment given with reference to the appended drawings.

BRIEF DESCRIPTION OF THE DRAWINGS

FIG. 1 is a plan view of the socket member of the device in accordance with the invention.

FIG. 2 is a view of the fully equipped device in the connected position shown in elevation and partly in cross-section.

FIG. 3 is a view corresponding to one half of FIG. 2 showing the movable plug member prior to its insertion into the socket member.

FIG. 4 is a view in cross-section on the line IV—IV in FIG. 3 showing the structure of the clamping system.

FIG. 5 is a perspective view of the fiber holding device opened out prior to insertion of the bared fiber end.

FIG. 6 is a view analogous to that of FIG. 3 showing the internal structure of the plug member with the device in a temporary disconnection position.

FIG. 7 is a diagram showing various degrees of curvature of the bared fiber end according to the forces applied to it.

DESCRIPTION OF THE PREFERRED EMBODIMENT

FIG. 1 shows the socket member used in the device, in which the mobile plug members (not shown) are inserted and held in position, together with the fiber ends, by a clamp member (not shown either) adapted to be maneuvered by the operator.

The socket member 100, the structure of which is substantially symmetrical relative to a median plane P, comprises a single guide member 110 which will accommodate and align the two fiber ends, by virtue of a technique that is in itself conventional.

This guide member is V-shaped for example (as seen in cross-section in FIG. 4); the V has a depth of 100 $\mu$m, for example, in the case of a 125 $\mu$m diameter fiber; in this way the fibers once positioned and brought into abutting relationship will protrude from the V, enabling them to be clamped against it by the clamp member which will be described later, so as to achieve a "mechanical splice" according to the technique illustrated by the aforementioned French Pat. Nos. 2 367 295 and 2 476 856, for example.

To permit perfect centering of both fibers within this V 110 there is provision in accordance with one characteristic of the invention for extending the guide member by a flared surface 120 constituting a preliminary guide member.

This surface, also seen in FIG. 3, is of dihedral shape, for example, symmetrical relative to the longitudinal plane of symmetry of the device.

When the fiber is inserted into the device, this flared surface 120 enables it to be centred and oriented correctly so that it is perfectly positioned within the guide member 110.

The socket member comprises two slides 130 which are upwardly open and which will receive the mobile plug members and guide them towards the guide member 110.

As can be seen in FIG. 2, these slides are inclined at an angle $\theta$ relative to the general plane of the socket member; this angle is in the order of 10°.

The slides are upwardly open in their rear part, as can be seen in FIG. 3 in particular; thus the plug member can be inserted into the slide through the upper part thereof (arrow A, FIG. 3), final insertion being accomplished by an axial displacement of limited amplitude (arrow B, FIG. 3): in this way the plug member may be brought near to the median plane P of the device at a small distance x therefrom, this distance being very much smaller than the overall length of the device.

Finally, the slides comprise a guide groove 131 (FIG. 3) cooperating with a complementary projection 201 on the plug member 200; two notches 132, 133 are provided on this groove to provide a snap fastener type action at two positions (temporary disconnection 133/connected 132), these notches cooperating with a projection 202 complementary to the projection 201 (the socket member is made of a molded plastics material providing the elasticity necessary for such snap fastener engagement).

The structure of each of the mobile plug members 200 will now be described with special reference to FIG. 3 (showing the plug member from the side, prior to its insertion into the device) and FIG. 6 (showing the plug member in cross-section).

Each of the plug members 200 cooperates with the slide 130 against which it rests through its lower surface 203; guidance at the time of insertion being provided by the groove 131 and the projection 201 as indicated above.

The plug member 200 comprises a central channel 210 oriented longitudinally and terminating at its rear end in a larger diameter receptacle 220 and at its front end in smaller diameter orifice 230.

The receptacle 220 is adapted to accommodate a fiber holding device 11 which clamps the optical fiber 10 and attaches it to the plug member. It will be noted that the axis $\Delta 1$ of the receptacle (meaning the axis of the fiber in the rear part of the plug member) and the axis $\Delta 2$ of the central channel 210 are offset by a distance $\delta$; on the other hand, the orifice 230 is coaxial with the axis 2 of the channel 210.

This arrangement imposes on the projecting part 12 of the bared fiber end a preferred orientation in a plane containing the two axes $\Delta 1$, $\Delta 2$ after insertion of the fiber holding device 11 into the receptacle 220 of the plug member. When the plug member is subsequently inserted into the socket member, this pre-positioning will ensure that the end part 13 of the bared fiber end, meaning the part which protrudes from the orifice 230, is approximately positioned at the bottom of the dihedron 120, so procuring optimal preliminary guidance of this protruding part in the direction towards the guide V 110 in the central part of the device.

The fiber holding device 11 is shown in isolation in FIG. 5, prior to inserting the bared part of the fiber; this part advantageously consists of two complementary members 11a, 11b molded in one piece from a material of sufficient elasticity to ensure that, after this part 11 is inserted into the receptacle, the fiber is perfectly clamped through the sheathed part pushed fully home into the member formed by the two complementary members when mated together.

The plug members also comprise, at the front, reciprocal abutment and support surfaces (as shown in FIG. 2) permitting relative positioning of the two plug members independently of the geometry of the socket member and their dimensional tolerances.

It will be noted that this abutting relationship is achieved in the optical connection area, thus optimizing the relative positioning of the two plug members and thus of the two fiber ends (the abutment surfaces 240 are in fact at the end of two lateral extensions of the lateral surfaces, each of which is inserted into grooves 140 in the socket member 100 and 370 in the clamp member 300, formed on respective opposite sides of the guide member 110).

The clamp member 300 is preferably the same as the clamp member described in French patent application No. 82 05441 filed March 30, 1982 by the French company SOCAPEX and published under the No. 2 524 654.

The clamp member and the device locking means shown in the appended drawings will now be described.

The clamp member 300 is inserted into a well 150 (FIGS. 1 and 2) extending upwardly in the central part of the device and guiding the clamp member 300 which is vertically movable within it.

The primary function of the clamp member 300 is to lock the plug members in position in the socket member. To this end there is provided a projection 310 cooperating with notches 250, 260 on each plug member.

The notch 250 serves to lock the plug member in the connected position (the position shown in FIG. 2), meaning the position in which the front abutment surfaces 240 of the two plug members are in contact so that the optical connection between the two fibers is established. Locking in this position prevents withdrawal of a plug member from the socket member until such time as the device is unlocked.

The notch 260 is used to lock the plug member into a temporary disconnection position preventing its withdrawal from the socket member after a limited movement to the rear from the connected position (this temporary disconnection position is that shown in FIG. 6, for example).

Finally, the projection 310 also prevents insertion of a plug member into the socket member until such time as the device is unlocked.

The locking and unlocking of the clamp member are achieved by a control means 320 in the form of a lever operating a cam 340: FIG. 3 shows the unlocked position (clamp member raised) and FIGS. 2 and 6 show the locked position (clamp member lowered and immobilized).

Another function of the clamp member is to press the fiber ends against the bottom of the guide V 110 and to immobilize them.

This is achieved by means of the part 330 (FIGS. 3 and 4) carrying a deformable elastic member 350 in line with the guide V 110.

The elasticity of the member 350 results, for example, from appropriately choosing the plastics material from which the clamp member is made.

Surfaces 360 are provided on either side of the clamp member (see FIG. 4) so as to come into abutting relationship with complementary surfaces 160 on the socket member. When the elastic member 350 is not loaded it projects to a distance e beyond the plane of the abutment surfaces 360. When the clamp member is moved downwards, the abutment surfaces limit the deformation of the elastic member 350 to a value ensuring that the fibers are immobilized without being excessively stressed.

The preparation of the fiber, its fitting into the plug member and the making of the optical connection will now be described.

The process begins with stripping a fiber and the end of the sheathed part is placed in the fiber holding device 11 shown in FIG. 5, as described above. The stripping operation may be carried out after fitting the fibre into the part 11.

The device 11 is then placed in the receptacle in the rear part of a plug member so as to clamp elastically the fiber and fasten it into the plug member.

The projecting bared part is then broken off at a predetermined distance from the end of the plug member.

Two plug members having been prepared in this way, they are fitted into a common socket member: because of the preliminary guiding dihedra 120, inserting the plug member positions the free end of the fiber in the guide V 110.

Moving the two plug members towards each other into abutting relationship brings the two front surfaces at the ends of the fibers into contact so that they are clamped together by reaction forces, providing a perfect optical connection.

Because of possible tolerance variations between the lengths of the protruding parts of the bared fibre ends, the mating plane P' is not necessarily coincident with the median plane P of the device. One advantage of the system in accordance with the invention is precisely to permit an offset and compensation of tolerances by virtue of greater or lesser flexing of the part 12 of the bared fiber end situated within the channel 210 in the plug member.

FIG. 7 schematically illustrates the possible deformation of the part 12 of the fiber emerging from the fiber terminating device 11 with its end resting on the guide V 110.

FIG. 7a shows the two extreme positions (with no stresses and with stresses corresponding to the maximum tolerances), as well as a median position; these positions are shown again in FIGS. 7b, 7c and 7d, respectively.

With no reaction force on the fiber end (no axial stress) the fiber has a single bend of limited curvature, for example $R1=100$ mm.

With a high reaction force (maximum axial stress) the fiber can assume a double curve, for example with $R2=50$ mm (the radius of curvature remaining greater than the maximum value the fiber can tolerate) and $R1=100$ mm, with a point of inflexion X.

It will be noted that the various dimensions of the plug member and the socket member are distributed so that, for any position of the fiber as shown in FIG. 7, the protruding part of the bared fiber end never comes into contact with the walls of the orifice 230, preventing any reaction forces at this point.

Finally, the following subsidiary advantages procured by the invention should be noted:

By virtue of their shapes the various component parts of the device in accordance with the invention are totally suitable for manufacture by molding, so that they can be made from a material that can be injection molded using a conventional technique achieving excellent dimensional accuracy.

The clamp member is entirely demountable; all that is needed is to take out the cam spindle; this arrangement provides extremely easy access to all parts of the device, especially the guide member, as when cleaning or checking is required, for example.

A plurality of connecting devices may be juxtaposed, fixed to a common cylindrical bar by screws or snap fastener fashion, for example. This feature, combined with the possibility of inserting the plugs from above, makes it possible to group a large number of connecting devices into a very limited space.

The device can be widely used for multimode fibers of 125 $\mu$m or any other value diameter; it is also possible to use monomode fibres featuring good concentricity since these enable correct alignment by simple centering on the outside diameter of the fiber (which are in contact with the walls of the guide V).

The very limited clearance between the various parts ensures excellent sealing against dust without it being necessary to provide specific sealing means.

It will be understood that various changes in the details, materials and arrangements of parts which have been herein described and illustrated in order to explain the nature of the invention may be made by those skilled in the art within the principle and scope of the invention as expressed in the appended claims.

We claim:

1. A connecting device for making a non-permanent connection between two optical fibers each of which is fixed into a respective fiber holding device from which protrudes a bared end of the fiber, said connecting device comprising:

a socket member, a guide member on said socket member adapted to accommodate the aligned bared fiber ends, a clamp member in line with said guide member adapted to immobilize said bared fiber ends by clamping said bared fiber ends against said guide member, and two mobile plug members each adapted to interlock nesting fashion with said socket member one on each side of said guide member so that their axes are at a predetermined angle to said guide member, wherein each plug member comprises a front surface through which one plug member is adapted to come into an abutting and supporting relationship to the other plug member a central channel, a receptacle at a rear end of said channel for said fiber holding device, and an orifice at a front end of said channel slightly larger than the diameter of said bared fiber end, and the length of said central channel is sufficient to allow part of said bared fiber end to protrude through said orifice after said fiber holding device is fitted into said receptacle and the width of said central channel is sufficient to allow limited flexing of said bared fiber end in response to loads applied to said protruding part thereof, whereby plugging said plug members into said socket member brings the end surfaces of the two fibers into contact inside said guide member, flexing of the fiber in said central channel producing reaction forces to pressurize this contact and allowing displacement of the mating plane defined by the contacting end surfaces relative to the median plane of the device.

2. Device according to claim 1, wherein an axis of said receptacle is offset relative to an axis of said central channel so as to position said protruding part of said bared fiber end in a plane containing said two axes after insertion of said fiber holding device into said plug member.

3. Device according to claim 1, wherein said guide member has at each end a flared surface constituting a preliminary guide member.

4. Device according to claim 1, further comprising locking Means operative in a connected position to prevent either removal of said plug members from said socket member or their insertion into said socket member.

5. Device according to claim 4 comprising control means adapted to actuate said locking means and said clamp member.

6. Device according to claim 4, wherein said locking means also define a temporary disconnection position to prevent withdrawal of said plug members from said socket member following limited movement of said plug members to the rear of their connected position.

7. Device according to claim 1, wherein said socket member comprises a general stone and two symmetrical slides adapted to receive said plug members and guide them towards said guide member.

8. Device according to claim 7, wherein, relative to said general plane of said socket member, said slides are inclined towards said guide member.

9. Device according to claim 7, wherein a rear part of said slides is open upwardly to allow said plug member to be inserted into said slide through the top part thereof.

10. Device according to claim 1, wherein said clamp member comprises a member movable in translation and a cam for moving said member.

11. Device according to claim 1, wherein said clamp member comprises a deformable elastic member in line with said guide member.

12. Device according to claim 11, wherein said clamp member comprises abutment surfaces adapted to contact said socket member to limit travel of said clamp member and the deformation of said elastic member in order to immobilize the fibers without unduly stressing them.

13. A mobile plug member for use in a connecting device for making a non-permanent connection between two optical fibers each optical fiber fixed into a respective fiber holding device from which protrudes a bared end of the fiber, the device comprising a socket member, a guide member on said socket member adapted to accommodate the aligned bared fiber ends, a clamp member in line with said guide member adapted to immobilize said bared fiber ends by clamping said bared fiber ends against said guide member, and two mobile plug members each adapted to interlock nesting fashion with said socket member one on each side of said guide member so that their axes are at a predetermined angle to said guide member, said plug member comprising:

a front surface through which it is adapted to come into an abutting and supporting relationship to another plug member, a central channel, a receptacle at a rear end of said channel for said fiber holding device, and an orifice at a front end of said channel slightly larger than the diameter of said bared fiber end, and the length of said central channel is sufficient to allow part of said bared fiber end to protrude beyond it after said fiber holding device is fitted into said receptacle and the width of said central channel is sufficient to allow limited flexing of said bared fiber end in response to loads applied to said protruding part thereof, whereby plugging said plug members into said socket member brings the end surfaces of the two fibers into contact inside said guide member, flexing of the fiber in said central channel producing reaction forces to pressurize this contact and allowing displacement of the mating plane defined by the contacting end surfaces relative to the median plane of the device.

14. A fiber holding device for use in a connecting device for making a non-permanent connection between two optical fibers each of into a respective fiber holding device from which Protrudes a bared end of the fiber, said connecting device comprising a socket member, a guide member on said socket member adapted to accommodate the aligned bared fiber ends, a clamp member in line with said guide member adapted to immobilize said bared fiber ends by clamping said bared fiber ends against said guide member, and two mobile plug members each adapted to interlock nesting fashion with said socket member one on each side of said guide member so that their axes are at a predetermined angle to said guide member, wherein each plug member comprises a front surface through which one plug member is adapted to come into an abutting and supporting relationship to the other plug member, a central channel, a receptacle at a rear end of said channel for said fiber holding device, and an orifice at a front end of said channel slightly larger than the diameter of said bared fiber end, and the length of said central channel is sufficient to allow part of said bared fiber end to protrude through said orifice after said fiber holding device is fitted into said receptacle and the width of said central channel is sufficient to allow limited flexing of said bared fiber end in response to loads applied to said protruding part thereof, whereby plugging said plug members into said socket member brings the end surfaces of the two fibers into contact inside said guide member, flexing of the fiber in said central channel producing reaction forces to pressurize this contact and allowing displacement of the mating plane defined by the contacting end surfaces relative to the median plane of the device, said fiber holding device comprising two complementary members mating together around said bared fiber end.

15. Method of preparing an optical fiber termination comprising the steps of:

placing a fiber in a fiber holding device allowing a bared fiber end to protrude therefrom, inserting said fiber holding device and fiber into a plug member for use in a connecting device for making a non-permanent connection between two optical fibers each of which is fixed into a respective fiber holding device from which protudes a bared end of the fiber, the connecting device comprising a socket member, a guide member on said socket member adapted to accommodate the aligned bared fiber ends, a clamp member in line with said guide member adapted to immobilize said bared fiber ends by clamping said bared fiber ends against said guide member, and two mobile plug members each adapted to interlock nesting fashion with said socket member one on each side of said guide member so that their axes are at a predetermined angle to said guide member, said plug member comprising a front surface through which one plug member is adapted to come into an abutting and supporting relationship to the other plug member, a central channel, a receptacle at a rear end of said channel for said fiber holding device, and an orifice at a front end of said channel slightly larger than the diameter of said bared fiber end, and the length of said central channel is sufficient to allow part of said bared fiber end to protrude through said orifice after said fiber holding device is fitted into said receptacle and the width of said central channel is sufficient to allow limited flexing of said bared fiber end in response to loads applied to said protruding part thereof, whereby plugging said plug members into said socket member brings the end surfaces of the two fibers into contact inside said guide member, flexing of the fiber in said central channel producing reaction forces to pressurize this contact and allowing displacement of the mating plane defined by the contacting end surfaces relative to the median plane of the device, and breaking off said bared fiber end at a predetermined distance from the end of said plug member.

* * * * *